US005615489A

United States Patent [19]
Breyer et al.

[11] Patent Number: 5,615,489
[45] Date of Patent: Apr. 1, 1997

[54] METHOD OF MAKING COORDINATE MEASUREMENTS ON WORKPIECES

[75] Inventors: Karl-Hermann Breyer, Heidenheim; Klaus-Peter Koch, Aalen; Helmut Heier, Aalen; Hans-Gerd Pressel, Aalen, all of Germany

[73] Assignee: Carl-Zeiss-Stiftung, Heidenheim, Germany

[21] Appl. No.: 244,497

[22] PCT Filed: Sep. 17, 1993

[86] PCT No.: PCT/EP93/02523

§ 371 Date: May 25, 1994

§ 102(e) Date: May 25, 1994

[87] PCT Pub. No.: WO94/08205

PCT Pub. Date: Apr. 14, 1994

[30] Foreign Application Priority Data

Sep. 25, 1992 [DE] Germany .......................... 42 32 118.2

[51] Int. Cl.⁶ ............................ G01B 7/008; G01B 11/24
[52] U.S. Cl. .................................. 33/503; 33/556; 33/559
[58] Field of Search ............................ 33/503, 1 M, 504, 33/556, 557, 558, 559, 560, 561, DIG. 21; 356/375, 376; 364/559

[56] References Cited

U.S. PATENT DOCUMENTS

| | | |
|---|---|---|
| 3,869,799 | 3/1975 | Neuer et al. . |
| 4,637,119 | 1/1987 | Schneider et al. ........................ 33/561 |
| 4,908,951 | 3/1990 | Gurny .................................... 33/503 |
| 5,038,258 | 8/1991 | Koch et al. . |

FOREIGN PATENT DOCUMENTS

| | | |
|---|---|---|
| 0420416 | 4/1991 | European Pat. Off. . |
| 12609 | 2/1957 | German Dem. Rep. . |
| 3502388 | 9/1985 | Germany . |
| 3823993 | 1/1990 | Germany . |
| 9115942 | 7/1992 | Germany . |
| 3142301 | 9/1991 | Japan . |
| 4225173 | 12/1992 | Japan . |

Primary Examiner—Christopher W. Fulton
Attorney, Agent, or Firm—Walter Ottesen

[57] ABSTRACT

A coordinate measuring apparatus carries a video camera 6 and a mechanical probe head 7 having a probe element 8 for contact-measuring the workpiece surface. With the aid of the coordinate measuring apparatus, the locations on the workpiece 9 to be mechanically contacted are driven to under visual control with the aid of the monitor 10 connected to the video camera. For this purpose, the probe element 8 is located in the viewing field of the video camera 6.

15 Claims, 8 Drawing Sheets

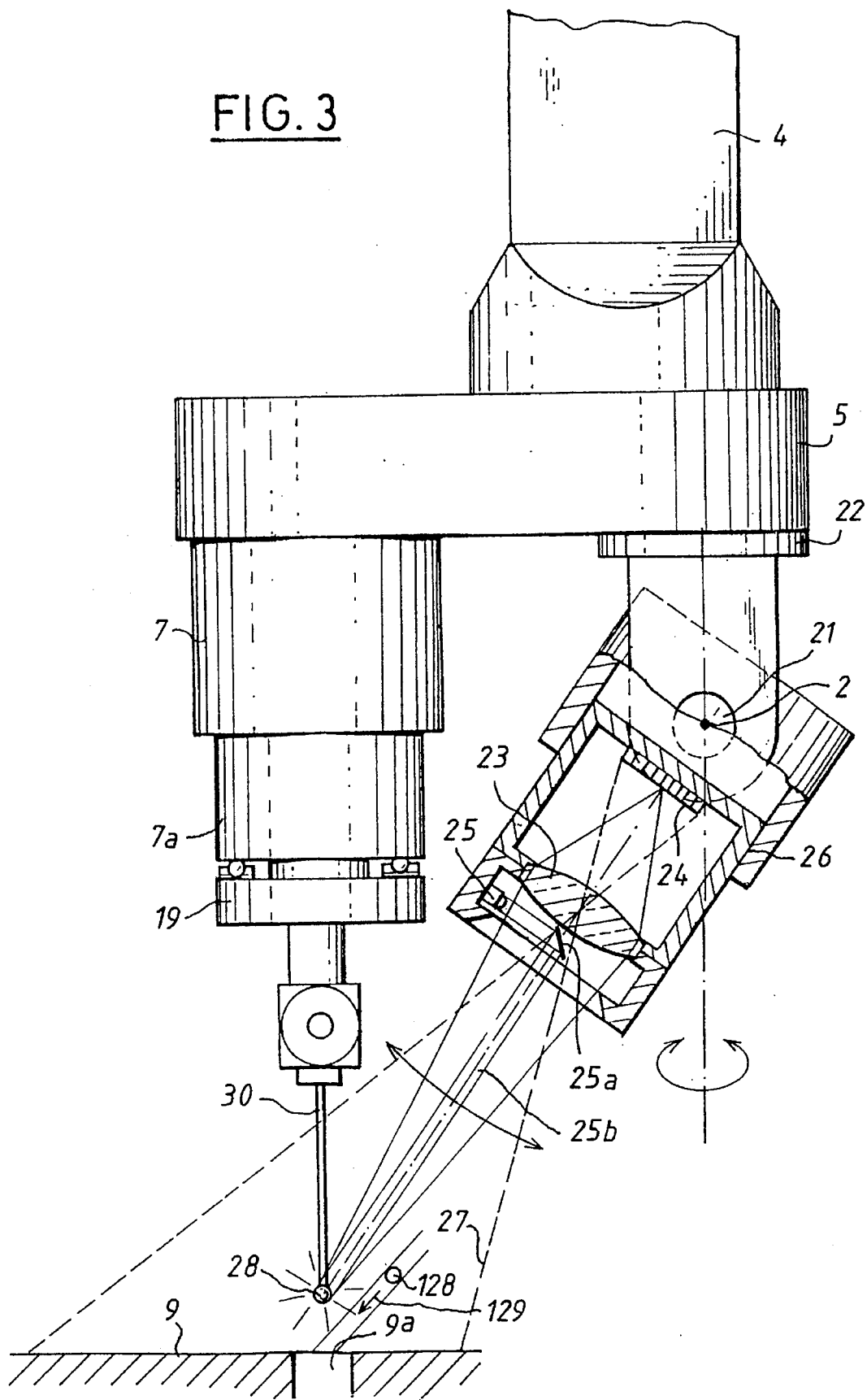

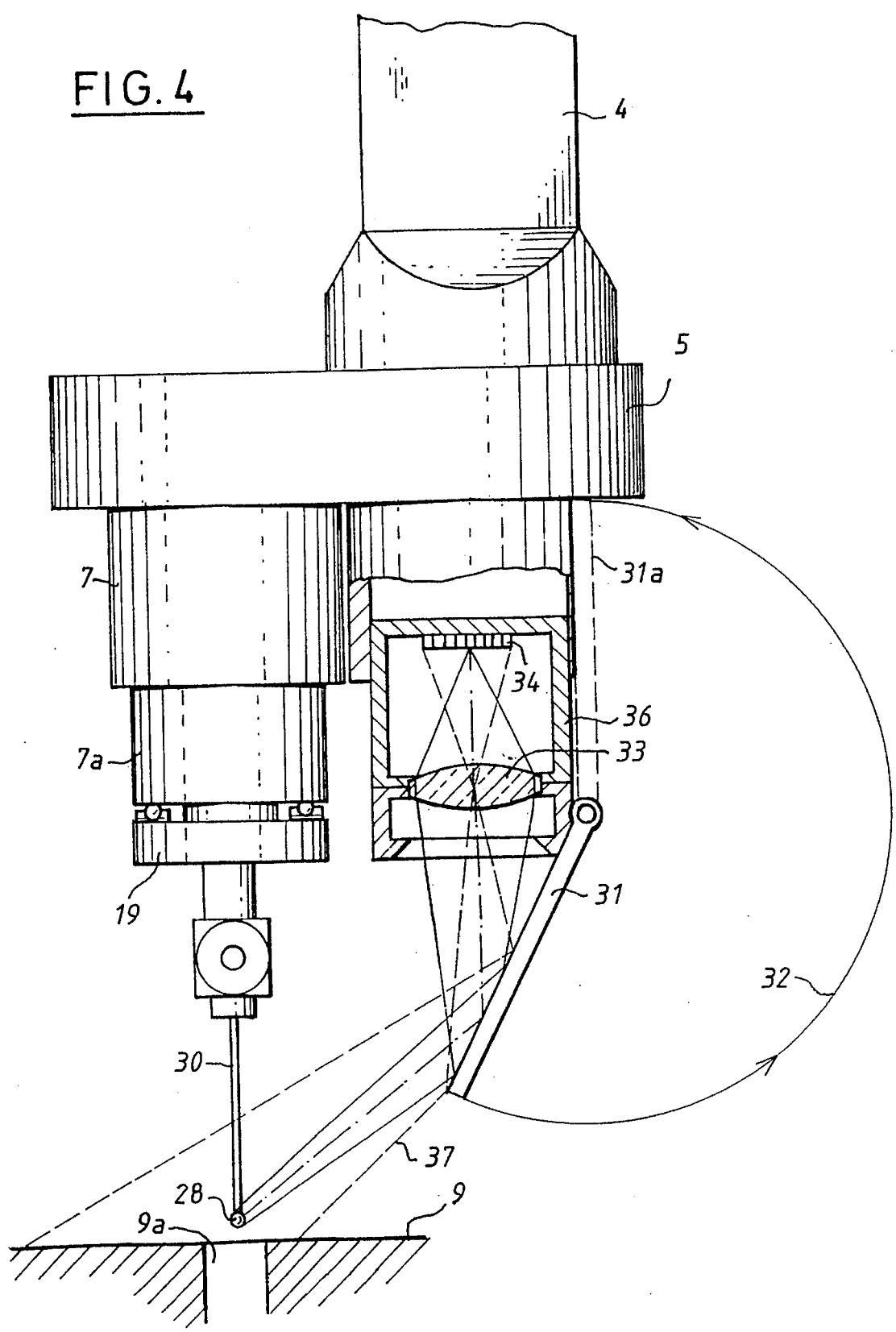

METHOD OF MAKING COORDINATE MEASUREMENTS ON WORKPIECES

BACKGROUND OF THE INVENTION

For the coordinate measurement on workpieces, coordinate measuring apparatus having measuring or switching probe heads are, as a rule, utilized. Such apparatus directly measure the workpiece surface by touching mechanical contact with the probe element attached to the deflectable part of the probe head. The probe element is, in most cases, a ball.

In addition, coordinate measuring apparatus are known which carry a so-called optical probe head which "touches" the object to be measured without contact. As optical probe heads, in addition to probes operating with light points (such as triangulation probes), mostly so-called video probe heads are utilized, that is, video cameras which detect a greater portion of the workpiece surface. The coordinates of geometric elements of the workpiece of interest are determined then, for example, via a video processing software.

In recent times, combined optically and mechanically contacting coordinate measuring apparatus have become known. One such apparatus is described, for example, in U.S. Pat. No. 4,908,951. The known apparatus has two spindles of which one spindle carries the mechanical probe head while the other spindle holds a video camera having a beam path into which a laser probe is simultaneously reflected for making measurements in the z-coordinate, that is, along the optical axis of the video camera.

Such combined optically and mechanically contacting coordinate measuring apparatus permit not only the measurement of different workpieces such as printed circuit boards or motor housings with the measuring methods best adapted thereto (optically without contact or mechanically contacting). It is also possible to measure locations on the same workpiece first with the video camera and then with the mechanical probe since the mutual reference of the two probe systems can be established via a calibration procedure.

The actual measuring procedure then takes place as described below.

(a) Manually controlled operation: Here, the location on the workpiece to be contacted with the mechanical probe head is approached under direct visual control. After contacting the workpiece with the probe element, which is mostly indicated acoustically, the computer assumes the coordinates of the contact point and the operator drives with the probe element to the next measurement location on the surface of the workpiece. While measuring with the video camera, the video camera is moved over the corresponding location on the workpiece and focusing of the image of the workpiece surface is monitored with the aid of the monitor and thereafter, the transfer of data is triggered.

(b) CNC-operation: Here, the positions to be approached by the mechanical probe head or by the video camera are either in part remotely programmed or, in the context of a so-called learning program, the movement sequence is carried out on a sample piece including driving to the contact locations for the special measuring program, then stored and then repeated as often as desired in the series measurement operation on a series of like parts to be measured.

The manually controlled contacting presents problems especially for complicated workpieces having poorly accessible inner surfaces because it is difficult to maintain visual contact with the probe element. If this visual contact is lost, then the danger is present that the probe head or probe pin is damaged by a collision with the workpiece or the incorrect location on the workpiece is contacted. This danger is present also during the learn programming of the CNC-operation since the probe element is there likewise manually-controlled driven.

From East German Patent 12,609, it is known to measure bores with the aid of an illuminating measuring bead under visual control. The measuring bead is brought mechanically into contact with the bore wall. The method described in this East German patent is, however, not applicable to a coordinate measuring apparatus and the measuring bead is not a mechanical probe such that this probe can independently register the coordinates of the contact point. Instead, the measuring bead simply serves as a measuring mark with the aid of which the bore diameter is determined visually with an ocular plate in a measuring microscope. The method can furthermore only be used for bores which are accessible from both ends.

SUMMARY OF THE INVENTION

It is the object of the present invention to increase the safety in the mechanical contact operation with a coordinate measuring apparatus in the manually-controlled operation and to simplify the measuring sequence for the operator.

Here, approaching and contacting the location to be mechanically measured is monitored by the probe element visually with the aid of the video camera and its monitor. This is especially then advantageous when very small probe pins are lowered into bores with respect to which the direct visual contact cannot be maintained or can be maintained only with great difficulties. The method does not require greater additional complexity because video camera and monitor are present for a combined optically and mechanically measuring coordinate measuring apparatus. It is only necessary to ensure that the probe element is located in the viewing field of the video camera during the measurement operation. This can be ensured by a suitable alignment of video camera and mechanical probe in that, for example, the probe element is attached via an extension or an angle piece to the probe head or the probe element or the entire mechanical probe head or the video camera is rotationally or pivotally attached to the movable spindle or to the transverse arm of the coordinate measuring apparatus. It is also possible to direct only the beam path of the video camera in the direction toward the probe element, for example, via a mirror or a prism or suitable flexible image-conducting elements such as glass fiber cables.

Both the probe head and the video camera are preferably attached to a common carrier so that the spatial/geometric relationship between the mechanical probe head and the video camera is guaranteed to be stable over a long time. To adapt to different measuring tasks, the probe element of the mechanical probe head can be attached to the probe head so as to be exchangeable via a probe changing unit as is customary in such cases.

The invention affords special advantages when the mechanical probe head is a miniaturized probe head in the form of a so-called quartz oscillator probe as described in German utility model registration 9,115,942 and wherein the miniaturized probe head in any event contains a probe pin having a length of only a few mm and a probe element in the form of a ball having a diameter of a tenth of a mm. Here, the danger is especially great that not only the probe pin breaks off in the course of the mechanical contact operation but that the entire probe system can be damaged.

Such a mechanical miniature probe is preferably attached together with a video camera to the same exchange holder and can, for example, be exchanged for a large probe pin on the probe head of a coordinate measuring apparatus operating purely mechanically. This coordinate measuring apparatus can then additionally perform measuring tasks with the aid of the quartz oscillator probe which can be solved neither with a conventional mechanical probe head nor with a purely optical, for example, video probe head.

To make the probe head more visible, it can furthermore be advantageous to provide an illuminating device which excites the probe element to transmit scatter radiation.

Finally, and especially for work in bores and other hollow spaces of the workpiece, it is advantageous to configure the video probe head so that it contains two optics suitable for receiving stereo images and to mount the probe element in that portion of the viewing field which is common to both optics. In this way, the depth resolution of this photometric optical video probe head can be utilized for measurements in the z-direction. At the same time, the positioning of the probe head by the operator is improved when utilizing a suitable 3-D monitor. One such monitor is described, for example, in U.S. patent application Ser. No. 07/961,353, filed Oct. 15, 1992, now abandoned which is incorporated herein by reference.

When the optical axis of the video camera is inclined with respect to one of the machine axes of the coordinate measuring apparatus, then it is difficult to manually drive to the desired point on the workpiece because of the parallax between the drive direction and the target direction. Here, it is advantageous to configure the control of the coordinate measuring apparatus so that the probe head of the apparatus is displaced simultaneously in at least two machine axes in correspondence to the angle of inclination between the optical axis of the video camera and the machine axis under consideration.

With the method of the invention, not only is the measuring sequence made more reliable and is simplified for the actual inspection of the parts to be tested, but the programming of the measuring sequences on sample workpieces is simplified in that the locations on the workpiece to be contacted can be driven to in advance, that is, in the course of the learn programming, not with a mechanical probe but with a video probe head. Since no mechanical probe is utilized in the course of this manually controlled procedure, damage is reliably avoided. In this context, it is advantageous when the locations on the workpiece to be contacted mechanically later are driven to with the video probe head under monitor control and an electronically generated mark is superimposed on the image on the monitor. The mark corresponds in form and size to the probe element of the mechanical probe head with which the actual measuring sequence is subsequently carried out.

Furthermore, it is advantageous to assign an illuminating unit having several light sources to the video camera. The several light sources radiate in different directions and their electronics are so configured that the light sources are driven individually or in groups. With such an illuminating unit as it is described inter alia in U.S. Pat. No. 5,038,258, the intensity and the direction of incidence of the light can be adjusted in a targeted manner and can be optimally adapted to the particular measuring task.

BRIEF DESCRIPTION OF THE DRAWINGS

The invention will now be described with reference to the drawings wherein:

FIG. 3 is an embodiment of the probe head changed slightly in comparison to that shown in FIG. 2;

FIG. 4 is a third embodiment of the probe head changed slightly with respect to FIGS. 2 and 3;

FIG. 5b shows the monitor 10 of the coordinate measuring apparatus of FIG. 1 with the image of the probe head picked up by the video camera 6 in FIG. 5a;

DESCRIPTION OF THE PREFERRED EMBODIMENTS OF THE INVENTION

Figure 1:
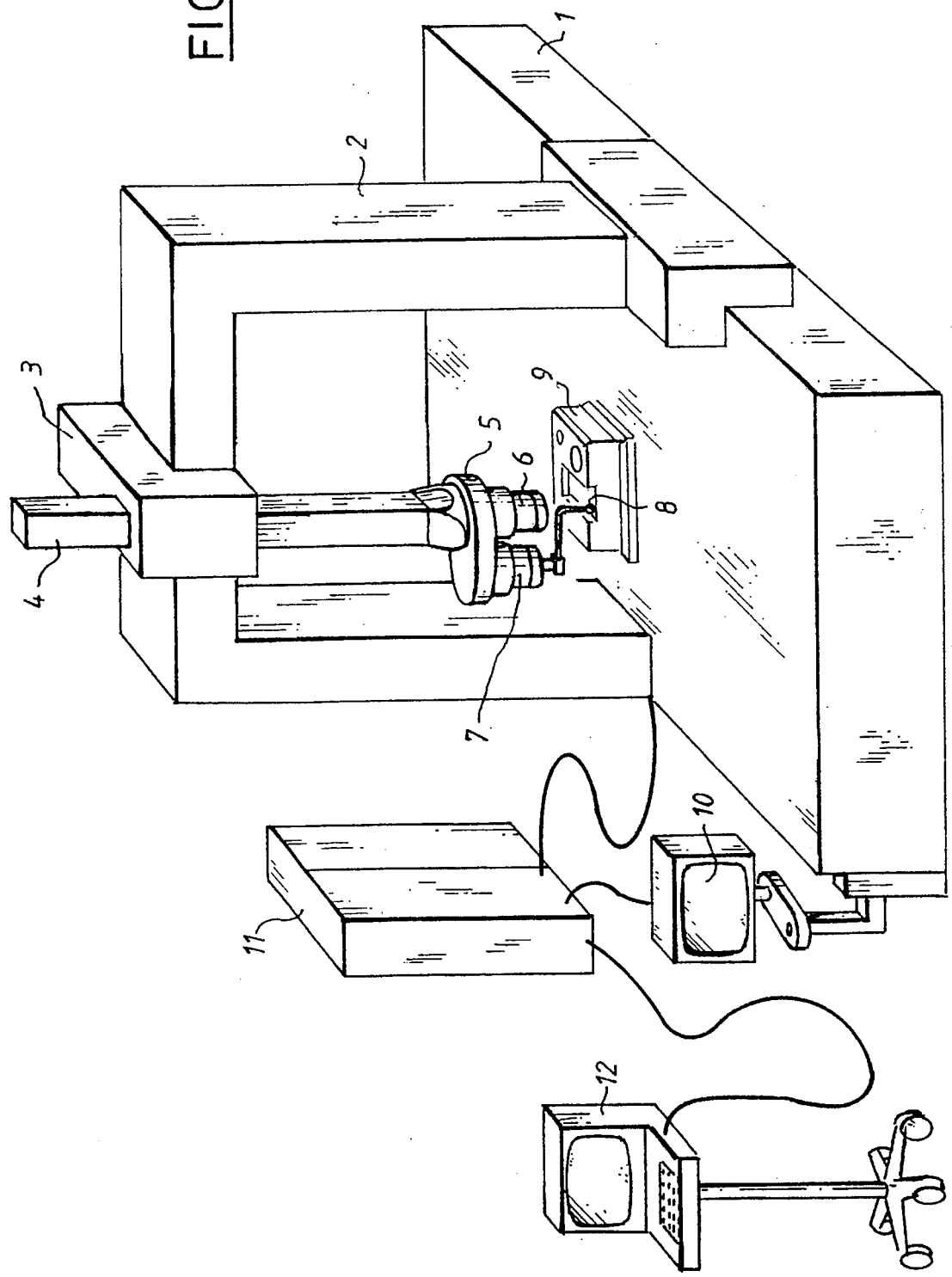
FIG. 1 is a simplified perspective sketch of a coordinate measuring apparatus suitable for carrying out the method of the invention.

The coordinate measuring apparatus shown in FIG. 1 is of the portal type and has a measuring table made, for example, of granite on which the workpieces 9 to be measured are placed. The granite table furthermore serves for guiding the movable portal 2 in the y-direction. The transverse beam of the portal 2 defines the x-guide for the movable transverse carriage 3 in which the so-called spindle 4 of the coordinate measuring apparatus is journalled so as to be displaceable vertically. A mechanical probe head 7 and a video camera 6 are attached at the lower end of the spindle 4 via a common holder 5.

The movement sequences of the coordinate measuring apparatus are monitored by a control 11 which communicates with a computer 12. The computer contains the measuring program for the CNC-operation and the evaluation programs for generating the measurement results.

The image of the workpiece surface picked up by the video camera 6 is displayed on a monitor 10.

Figure 2:
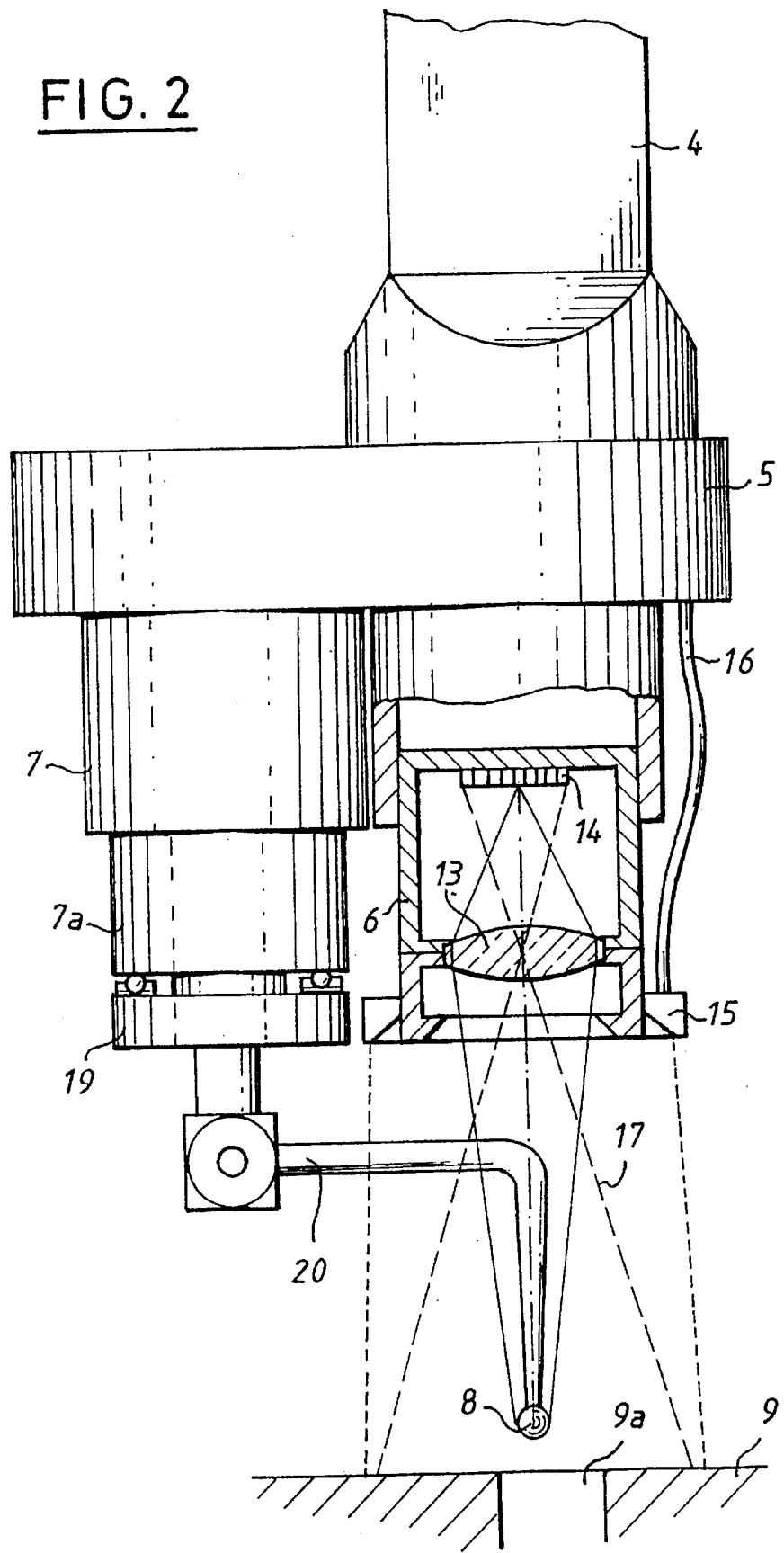
FIG. 2 shows the probe head of the coordinate measuring apparatus of FIG. 1 at an enlarged scale partially in section and partially in side elevation.

In FIG. 2, the holder 5 mounted at the lower end of the spindle 4, the video probe head 6 attached thereto and the mechanical probe head 7 are shown in more detail. The video camera has an objective 13 which images the workpiece surface on a CCD-chip 14. The viewing field of this video probe head corresponds to the cone identified by 17. This viewing field is illuminated by a fiber optical annular lamp disposed around the video camera 6. In lieu of the annular lamp, an illuminating unit can be used as described in U.S. Pat. No. 5,038,258.

The probe ball 8 of the mechanical probe is attached via an electromagnetic probe changing unit 19 known per se on the movable and deflectable part 7a of the probe head. The probe ball 8 is held via a probe pin 20 in the form of an angled piece which is so dimensioned that the probe ball 8 is located in the sharply imaged region of the viewing field 17 of the video camera. In this way, it is possible to follow the position of the probe ball 8 relative to the workpiece 9 and the bore 9a to be measured there very precisely with the aid of the monitor 10 and to manually control the contact operation when moving into the bore 9a.

The same is achieved also with the configuration shown in FIG. 3 according to an alternate embodiment of the invention. There, the probe ball 28 is attached in a conventional manner via a straight probe pin 30 to the electromechanical probe changing unit 19 of the mechanical probe head 7. The probe pin 30 is aligned along the probe axis. In contrast however, the video camera 26 is attached to the holder 5 via a rotational joint 22 and a pivot joint 21 and can therefore be aligned in all spatial directions. The video camera 26 is so aligned that its objective 23 can image the probe ball 28 on the image sensor 24 for visually viewing the contact operation. Reference numeral 27 identifies the cone which indicates the dimensions of the viewing field of the video camera.

The video camera 26 furthermore contains an ancillary light source 25 in the form of a laser diode radiating in the visible range and having a collimating optic placed forward thereof. The light beam emitted by the laser diode is reflected into the optical axis of the video camera by a mirror 25a forward of the objective 23 of the video camera. This light beam impinges on the probe ball 28 when the video camera is correctly aligned. The scattered radiation emitted from this location causes the probe ball 28 to appear brightly and clearly on the monitor screen.

The parallax based on the inclination of the optical axis of the video camera to the workpiece surface leads to the situation that the probe ball is more likely to be positioned at the location identified by 128 next to the actual target point when the operator, under visual control with the aid of the monitor, attempts to position the probe ball 28 over specific points of the workpiece 9 which are to be contacted such as shown in FIGS. 3 above the bore 9a. In the following contact operation, the probe head is displaced with the probe pin along the vertical machine axis z and the probe ball is then not lowered into the bore but strikes the surface of the workpiece. In order to avoid this and to facilitate operation, the control of the coordinate measuring apparatus can be so programmed that the control moves the probe head 7 in two axes simultaneously corresponding to the inclination of the camera axis as indicated by the arrow 129 when moving in the direction toward the workpiece 9.

In the embodiment of FIG. 4, the mechanical probe 7 and the video camera 36 are vertically aligned as in the embodiment of FIG. 2 and are attached to the holder 5 at the lower end of the spindle 4. The probe pin 30 with the probe ball 28 of the mechanical probe 7 is aligned vertically along the probe axis.

The video camera 36 is, however, equipped with a pivot mirror 31 which is pivoted into the position shown by the solid outline in FIG. 4 for visually monitoring the position of the probe ball 28 and the pivot mirror deflects the beam path of the objective 33 of the video camera 36 so that the probe ball 28 is located in the viewing field of the sensor 34 of the video camera 36.

For measuring tasks wherein only the video camera 36 is required, the pivot mirror 31 is pivoted as indicated by arrow 32 into the position 31a indicated in phantom outline.

Figure 5A:
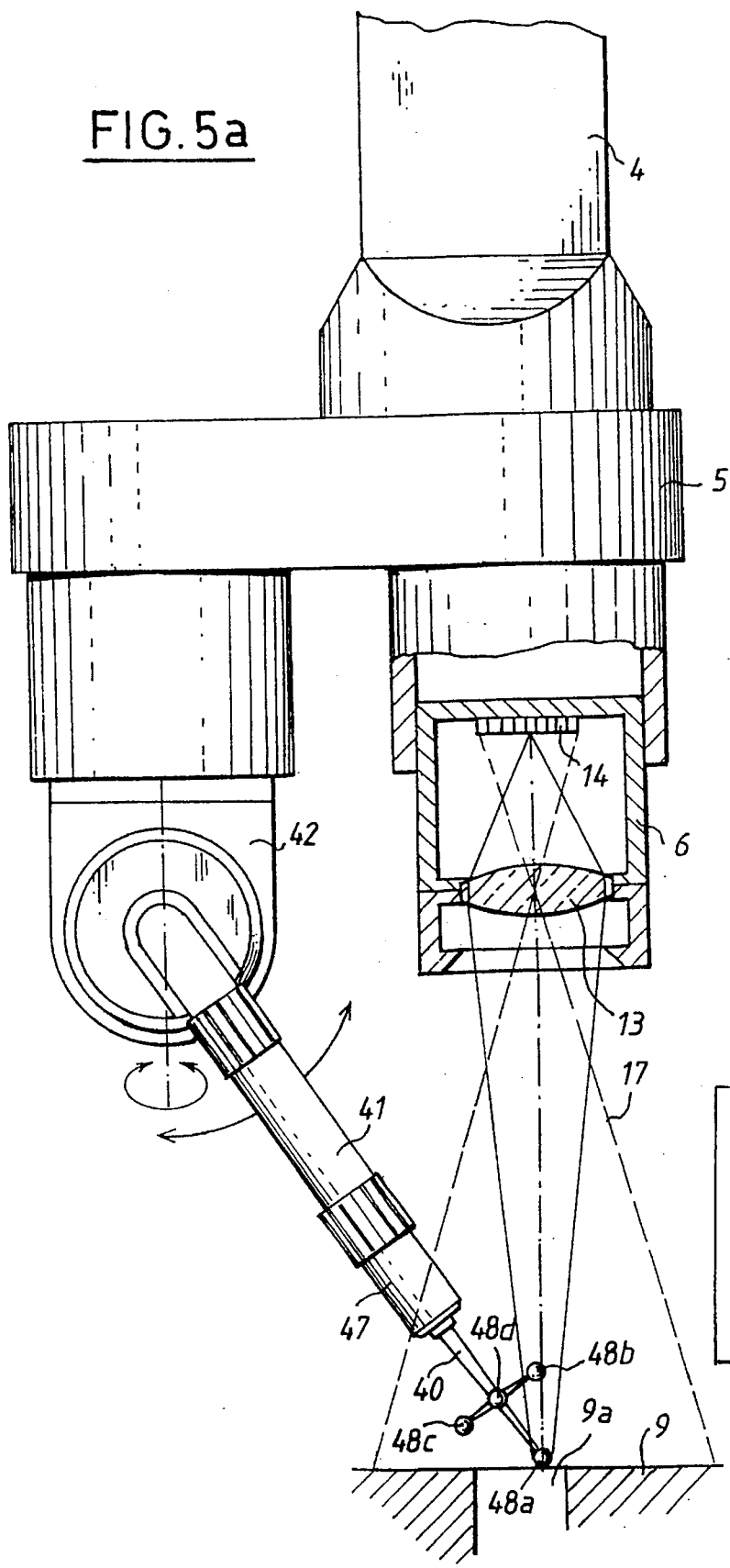
FIG. 5a is a fourth embodiment of the probe head changed slightly with respect to FIGS. 2 and 3.
Figure 5B:
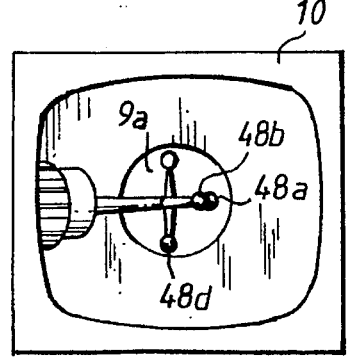

In the embodiment of FIG. 5a, the holder 5 carries the same video camera 6 described with respect to FIG. 2 at the lower end of the spindle 4. The mechanical probe head 47 is a small direction-independent switching probe head which is seated via an extension 41 on a so-called rotation/pivot joint 42 and therefore can be aligned in any desired spatial direction. The probe head 47 carries a star probe 40 having five probe balls 48a to 48e.

The probe head 47 is so aligned with the aid of monitor 10 for the visual control of the mechanical contact operation that the star probe 40 lies in the viewing field 17 of the objective 13 of the video camera.

Figure 6:
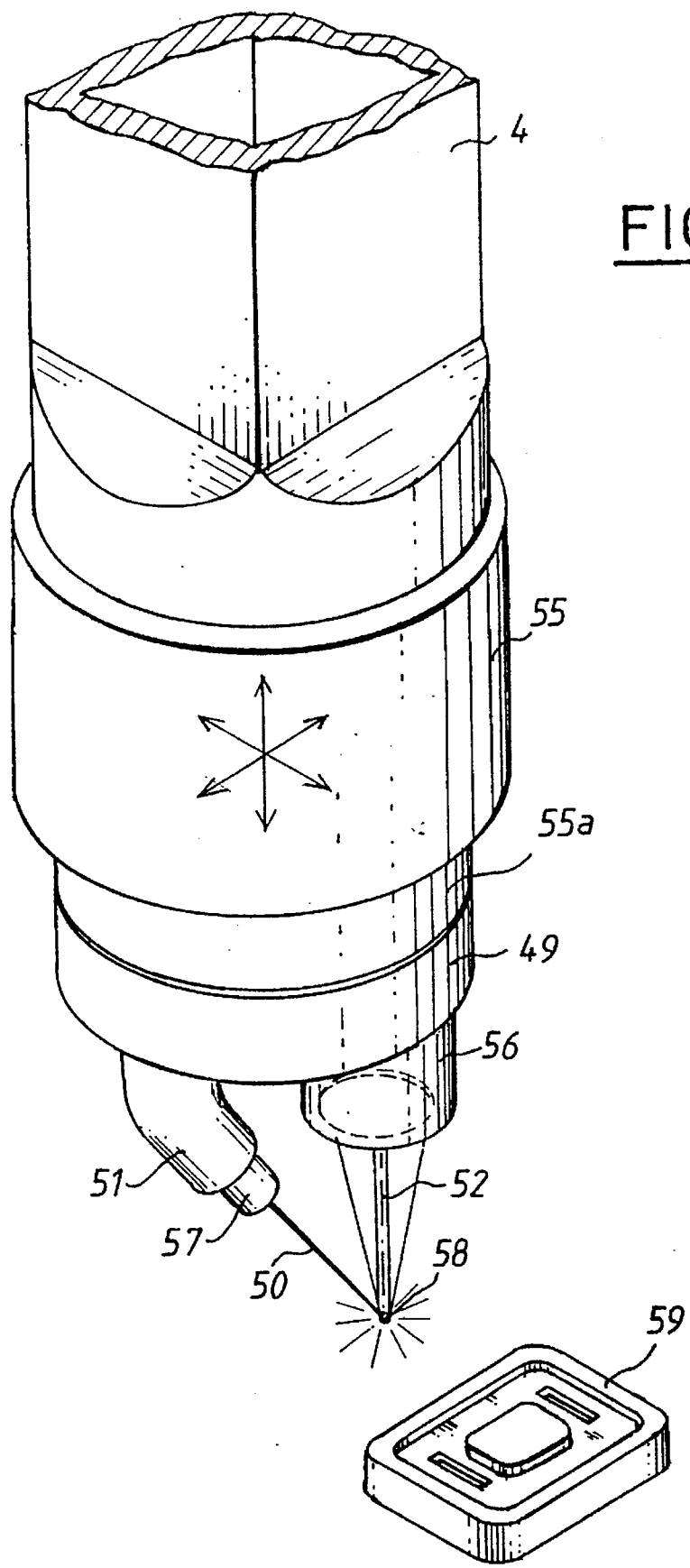
FIG. 6 shows a fifth embodiment of the probe head changed slightly with respect to FIGS. 2 and 3.

In the embodiment of FIG. 6, a probe head 55 of the so-called measuring type is seated directly on the spindle 4. Such a probe head is, for example, described in U.S. Pat. No. 3,869,799 and DE-OS 3,823,993.

The movable part 55a of this probe head can be shifted, as indicated by the arrows, in the three spatial directions by actuators (not shown) over paths having a length of several mm or cm. An electromagnetic probe changing unit is integrated into the movable part 55a of the measuring probe head 55 as described, for example, in U.S. Pat. No. 4,637,119. The change plate of this electromagnetic probe changing unit is identified by 49 and carries at its lower end a small video camera 56 and a mechanical probe head 57 in the form of a so-called quartz oscillator probe. The mechanical probe head 57 is mounted via an angle piece 51. The quartz oscillator probe comprises a quartz crystal oscillating at approximately 40 kHz on which a glass pin 50 having a length of several mm is attached. The glass pin 50 supports a probe element 58 at its forward end. This probe element 58 comprises a glass ball fused to the glass pin 50.

The angle piece 51 is rotatably attached to the lower end of the change plate 49 and is aligned in the present case so that the contact element 58 is located in the viewing field of the video camera 56. The contact element 58 is illuminated by a visible laser beam 52 reflected into the beam path of the video camera and is therefore clearly visible on the screen of the monitor (not shown).

Filigree structures of a plastic housing 59 are measured with manual control with the probe element 58 under visual control with the aid of the monitor of the coordinate measuring apparatus. Good viewing contact is especially important here in order to prevent the glass pin 50 of the quartz oscillator probe from breaking because of shaft contacts.

Work is conducted not only in the switching mode of operation when measuring ridges and recesses of the plastic housing 59 and the probe element 58 is moved with the aid of the drives in the three axes of the coordinate measuring apparatus. Rather, it is likewise possible to scan smaller regions of the workpiece surface at standstill of the machine axes with the actuators integrated into the probe head 55. Here, the probe ball 58 remains in direct contact with the workpiece 59 during the scan operation.

Figure 7:
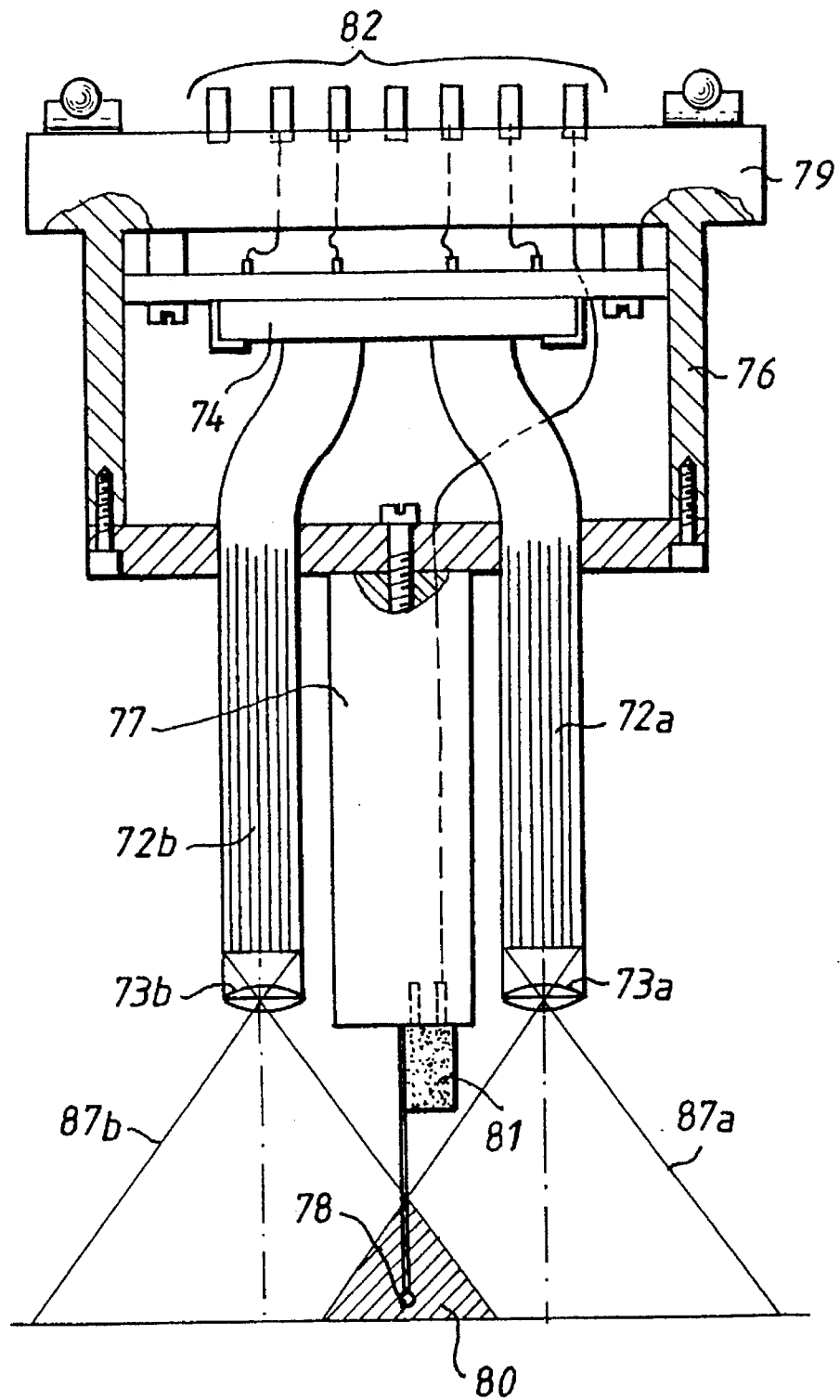
FIG. 7 shows a sixth embodiment of the probe head changed slightly with respect to FIGS. 2 and 3.

In lieu of the change plate 49 in the embodiment of FIG. 6, a second change plate 79 can be used with the optomechanical probe combination shown in FIG. 7. This probe comprises a photogrammetric video probe head, that is, a video probe head having two optics (73a and 73b) having an image which is transmitted via fiber optic image conductors (72a and 72b) to the light-sensitive surface of the image sensor 74. In this way, a stereo image of the region 80 is provided. The region 80 is covered in common by the two viewing fields (87a and 87b) of both optics.

A mechanical quartz oscillator probe 77 is mounted between the two optics (73a and 73b) of the video probe head 76. The quartz oscillator 81 of the probe 77 carries a glass pin having a length of several mm as in the embodiment of FIG. 6. A ball 78 is fused to the end of the glass pin and defines the contact element. This ball 78 is located in the overlapping region 80 of the two viewing fields (87a and 87b) of the video probe head 76.

Accordingly, with a suitable stereo monitor, the position of the contact element 78 can be excellently followed visually in space and the manual contact operation controlled. Here, the locations to be measured on the workpieces are driven to directly with the probe element 78 under visual control by the operator.

The electric supply of the video probe head and of the quartz oscillator probe is provided via contacts 82 on the rear side of the exchange plate 49. The signals of the image sensor 74 reach the control of the coordinate measuring apparatus via these contacts.

Figure 8:
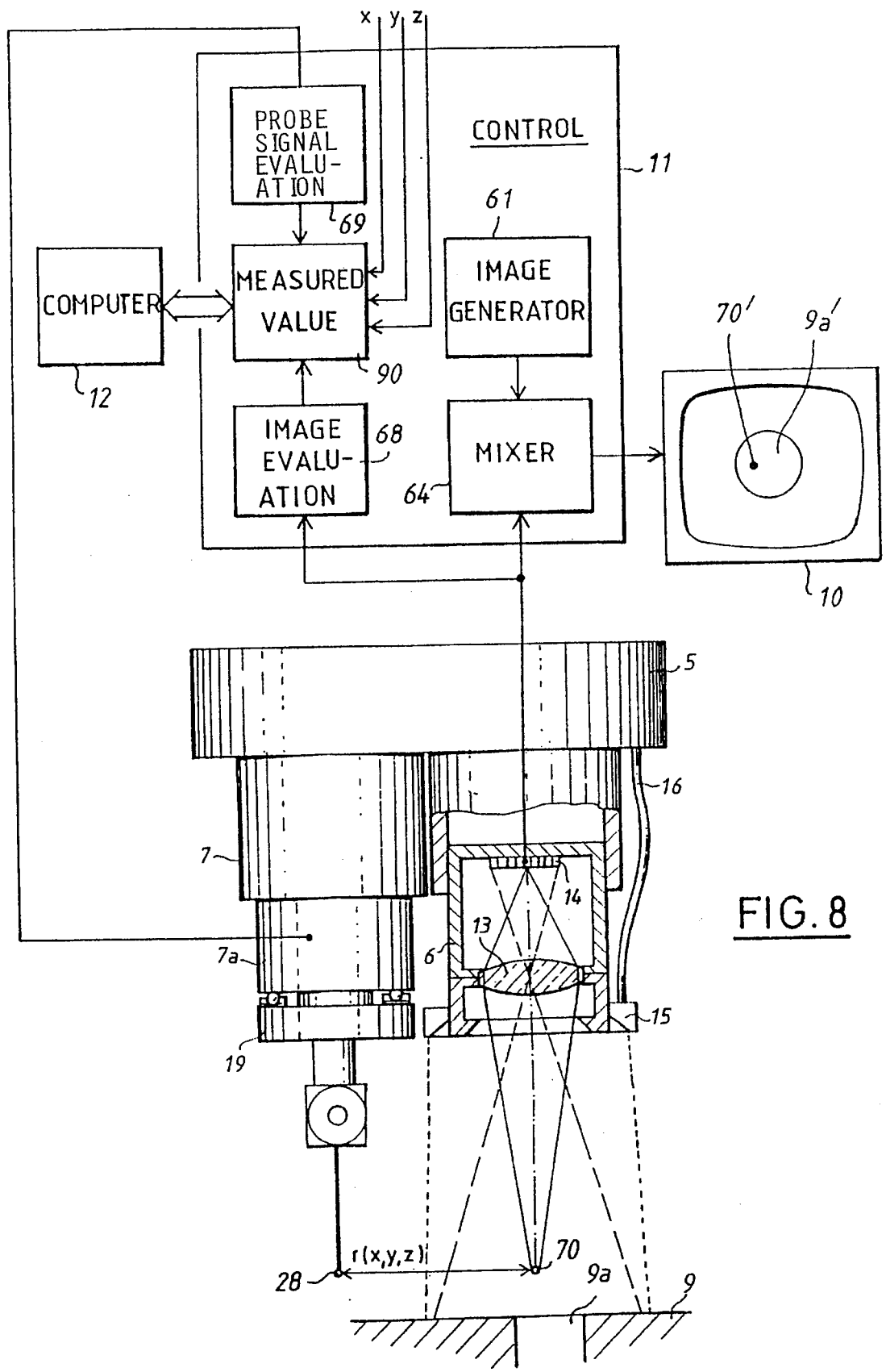
FIG. 8 is a block circuit diagram which shows the essential components of a coordinate measuring apparatus for carrying out an embodiment of the method of the invention.

In addition to manually driving to the measuring locations with the mechanical probe element, it is also possible to drive to the measurement locations only with the video camera under monitor control in the context of the learning programming and to specify the contact positions which are thereafter to be contacted in the CNC run by the mechanical probe element. The block diagram of a coordinate measuring apparatus suitable for this method is shown in FIG. 8. The coordinate measuring apparatus of FIG. 8 corresponds to that shown in FIGS. 1 and 2 with respect to its mechanical configuration with the exception that a probe element 28 is exchanged on the probe head 7 which does not necessarily lie in the image field 17 of the video camera 6. The probe element rather has a spacing (r [x, y, z]) to the focus point 70 of the video camera 6. This spacing can be determined in a manner known per se by calibration in the form of a comparison between the measured values obtained with the mechanical probe head 7 and the measured values determined with the video probe head 6 on a common sample workpiece (master).

The control 11 is connected to the computer 12 of the coordinate measuring apparatus via a data bus. The control 11 includes the components necessary for the control of the movement sequence of the coordinate measuring apparatus as well as modules which are necessary for detecting measured values. For example, reference numeral 90 identifies the module which generates the measured value picked up by the mechanical probe head. The measured value is generated from the signals of the photoelectric linear measuring systems in the three measuring axes (x, y, z) of the coordinate measuring apparatus and the signals of the probe head 7 processed in a module 69. The control 11 includes furthermore a module "image evaluation", which further processes the video signals of the image sensor 14 of the video camera, and, in combination with the signals of the linear measuring systems, supplies the measured value of the optical contact generated by the video camera.

Furthermore, the control 11 includes an image generator 61 having an output signal which is supplied via a mixer 64 to the monitor 10. The image generator superposes a mark 70' on the monitor image. The mark 70' corresponds in form and magnitude to the probe ball 28 while considering the imaging scale. This measuring mark 70' represents the focus point 70 of the video camera 6.

The image of the measuring mark 70' is superposed on the image of the workpiece surface 9. For this reason, the locations on the sample workpiece can be driven to with the probe element simulated in this manner in the context of the learning programming. These locations are thereafter contacted directly in CNC-controlled series measuring operation by the probe ball 28. To carry out this method, the operator (during the learning programming) brings, hand-controlled under visual control of the monitor image, the measuring mark 70' into alignment with the measuring locations on the geometric elements of the workpiece 9, such as the bore 9a, shown on the monitor and triggers the data transfer. The coordinates of the locations to be contacted are stored. These coordinates are thereafter converted into the contact coordinates of the mechanical probe element 28 with the aid of the known spatial relationship (r [x, y, z]) between the mechanical probe element 28 and the focus point (70 or 70') of the video camera. The known spatial relationship (r [x, y, z]) is determined in the previously described calibration operation. The contact coordinates can then be driven to under computer control automatically with the probe element 28 after a possibly required conversion into the workpiece coordinate system of the CNC-controlled parts to be measured.

It is not necessary to exchange the probe pin with the probe element 28 during the learning programming with the aid of the measuring mark simulating the contact element. This probe pin can instead be exchanged subsequently and be calibrated relative to the video camera.

We claim:

1. A method of making coordinate measurements on a workpiece with a coordinate measuring apparatus carrying a video camera and a mechanical probe element for contact measuring the workpiece surface, the method comprising the steps of:

mounting said probe element on a probe head of the coordinate measuring apparatus;

changing the position of an articulated joint so as to align the mechanical probe element and the video camera to each other so that the probe element is located in the viewing field of the video camera; and, driving to the locations on the workpiece to be mechanically contacted with the probe element under visual control with the aid of a monitor connected to the video camera.

2. The method of claim 1, wherein said video camera defines a contact point and wherein a spatial relationship (r(x, y, z)) exists between the mechanical probe element and said contact point which is determined by a calibration procedure; and, wherein the method comprises the further steps of:

first driving to the locations to be contacted on a sample workpiece with the aid of the video camera under visual control and manual control;

picking up the coordinates of said locations to be contacted with the video camera and storing said coordinates;

converting the stored coordinates with the aid of said spatial relationship (r(x, y, z)) into the contact coordinates of the mechanical probe element; and, driving to the same locations on the workpiece with the mechanical probe element under automatic control.

3. The method of claim 2, the method comprising the further steps of:

displaying the image of the workpiece picked up on said video camera on said monitor; and, electronically generating a mark having the form and size of the probe element and superposing said mark on said image.

4. The method of claim 3, wherein said mechanical probe head carries several probe elements and the method comprises superposing several marks of different form and size selectively on the image of the workpiece surface on the monitor.

5. A coordinate measuring apparatus for making measurements on a workpiece, the coordinate measuring apparatus comprising:

a monitor for displaying an image of the workpiece;

a video camera having a field of view and being connected to said monitor for supplying said image thereto;

a movable mechanical probe head having a probe changing unit and a probe element being mounted on said probe head via said probe changing unit to obtain measurements of the workpiece and said probe head including means for emitting signals indicative of said measurements;

computer and control means for processing said signals and for controlling the movement of said probe head relative to the workpiece; and, an articulated joint connected between said video camera and said mechanical probe for aligning said mechanical probe head and said video camera so as to cause said probe element to be in said field of view.

6. The coordinate measuring apparatus of claim 5, said probe head including a joint for connecting said probe element to said probe head so as to permit said probe element to be rotated and/or pivoted relative to said probe head.

7. The coordinate measuring apparatus of claim 5, further comprising said articulated joint being connected directly to said camera for rotating and/or pivoting said video camera relative to the workpiece.

8. The coordinate measuring apparatus of claim 5, further comprising a changing unit; and, said video camera and said mechanical probe head both being attached to said changing unit.

9. The coordinate measuring apparatus of claim 5, said video camera and said mechanical probe head conjointly defining an ancillary probe head of said coordinate measuring apparatus.

10. The coordinate measuring apparatus of claim 5, said mechanical probe head being a miniature probe head in the form of a quartz oscillator probe.

11. The coordinate measuring apparatus of claim 5, further comprising an illuminating unit for directing illuminating radiation onto said probe element thereby causing scattered radiation to emanate therefrom to make said probe element to appear bright and clear on said monitor.

12. The coordinate measuring apparatus of claim 5, said video camera having two optics for receiving stereo images; said two optics having respective viewing fields conjointly defining a common region wherein respective portions of said viewing fields overlap; and, said probe element being disposed in said common region.

13. The coordinate measuring apparatus of claim 5, said coordinate measuring apparatus having a plurality of machine axes and said video camera defining an optical axis inclined with respect to one of said machine axes; and, said computer and control means being adapted to move said mechanical probe head in at least two coordinate directions corresponding to the angle of inclination between said optical axis and said one machine axis.

14. The coordinate measuring apparatus of claim 5, further comprising an illuminating device for said video camera, said illuminating device being mounted on said video camera and having a plurality of light sources for radiating in various directions; and, means for driving said light sources individually or in groups so as to adjust the intensity thereof and/or the direction of the illuminating light.

15. A coordinate measuring apparatus for making measurements on a workpiece, the coordinate measuring apparatus comprising:

a monitor for displaying an image of the workpiece;

a video camera having a field of view and being connected to said monitor for supplying said image thereto;

a movable mechanical probe head having a probe changing unit and a probe element being mounted on said probe head via said probe changing unit to obtain measurements of the workpiece and said probe head including means for emitting signals indicative of said measurements;

computer and control means for processing said signals and for controlling the movement of said probe head relative to the workpiece;

a deflector for deflecting the beam path of said video camera in the direction toward the probe element; and, a pivot joint connecting said deflector to said video camera for adjusting said beam path of said video camera so as to cause said probe element to be in said field of view.

* * * * *